Figure 1:
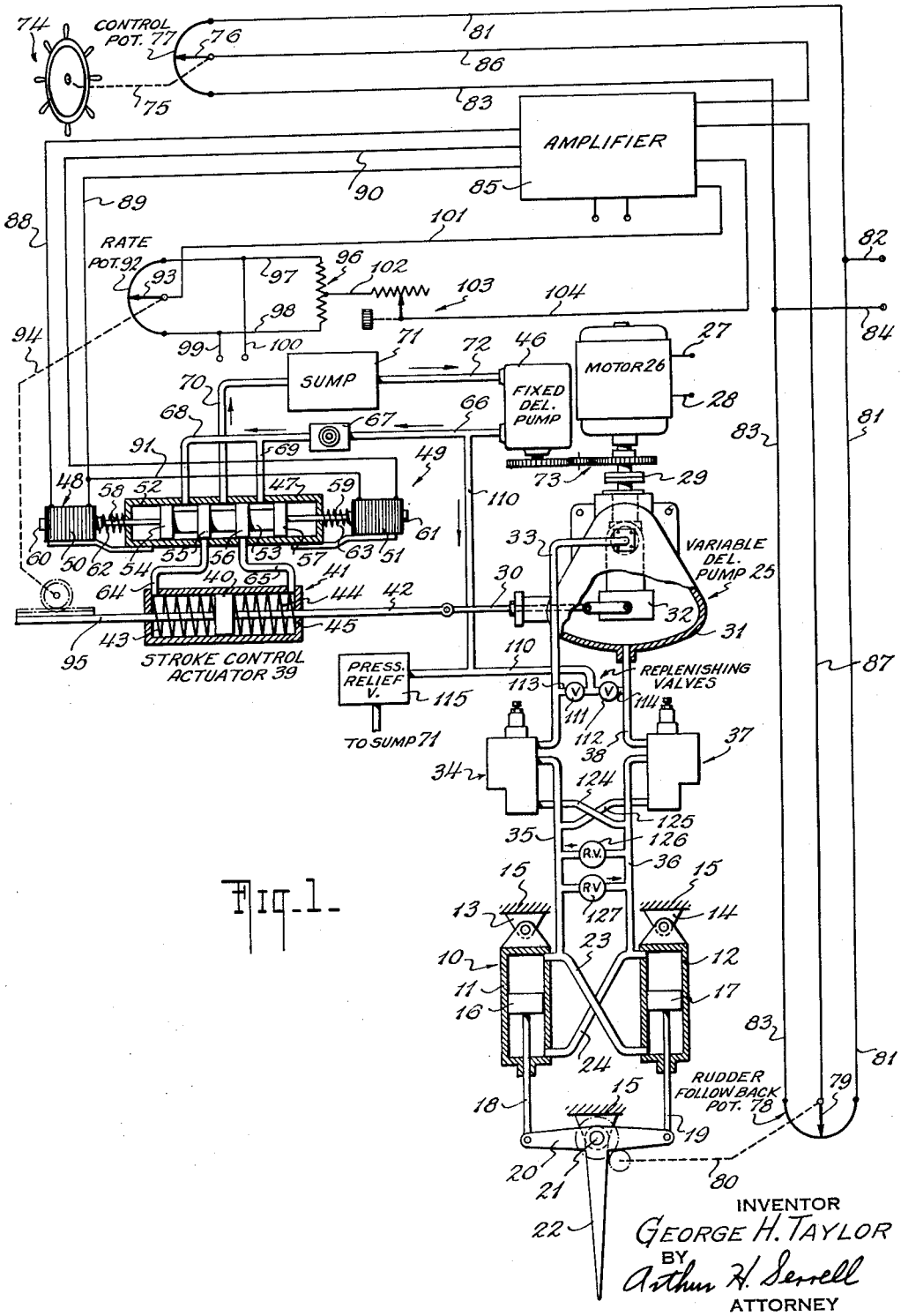

Dec. 16, 1958 G. H. TAYLOR 2,864,239
ELECTRO-HYDRAULIC SERVO SYSTEM FOR
STEERING DIRIGIBLE CRAFT
Filed Oct. 4, 1956 2 Sheets-Sheet 2

INVENTOR
GEORGE H. TAYLOR
BY
Arthur H. Serrell
ATTORNEY

United States Patent Office 2,864,239
Patented Dec. 16, 1958

2,864,239

ELECTRO-HYDRAULIC SERVO SYSTEM FOR STEERING DIRIGIBLE CRAFT

George H. Taylor, Wantagh, N. Y., assignor to Sperry Rand Corporation, a corporation of Delaware Application October 4, 1956, Serial No. 613,937

14 Claims. (Cl. 60—52)

This invention relates to a closed loop, electro-hydraulic servo system for steering dirigible craft such as aircraft and ships.

Conventional servo systems as utilized particularly in controlling the rudders of heavy marine craft are substantially hydraulic in character with a prime mover of the hydraulic ram type that is operatively connected to the rudder. Such systems include a hydraulic pump for delivering fluid under pressure to effect operation of the ram. The pump of the system is regulated by the mechanical output of a differential. The differential in turn has an input provided from a mechanical link to a control hydraulic servo cylinder. The other input to the differential is obtained from a direct mechanical feed back connection to the rudder. This combination mechanical hydraulic steering system operates to control the ram in accordance with any difference in the inputs thereof to the differential from the respective hydraulic control servo cylinder and the mechanical feed back connection from the rudder. The disadvantages of a system of this character include the obvious fact that the hydraulic fluid pipes must necessarily be very extensive and that wear in the mechanical follow back connection and in the mechanical differential reduces the sensitivity of the system as lost motion therein becomes greater.

The primary object of the present invention is to provide a steering system for dirigible craft that is not subject to the disadvantages noted for the conventional mechanical hydraulic servo system, the improved system being electro-hydraulic in character to reduce the extent of the hydraulic pipe required and also obviating the need of a mechanical differential. The performance characteristics of the improved system are accordingly enhanced.

A further object of the invention is to provide a combination system of the character described that utilizes a reversible variable delivery pump whose functioning in the system is not dependent upon the output of a mechanical differential.

One of the features of the invention is provided by a self-centralizing actuator for the pump stroke control member of the improved system.

Another feature of the invention resides in the structural provisions made in the hydraulic connections of the system for preventing rudder overhauling of the variable delivery pump of the system. This is particularly important on craft utilizing large rudders where during full power action and wide rudder angle conditions, the fluid pressure in the inflow connection to the pump could exceed the pressure in the outflow connection. The condition could also occur due to physical contact of the rudder with an object. The condition is obviated in the improved system by unidirectional flow valves in the respective connections between the pump and hydraulic motor, each of which includes a normally ineffective bypass. The respective overhaul control valves further include means responsive to the fluid pressure in the inflow connection to the hydraulic motor for rendering the fluid bypass in the outflow connection of the system effective. In preventing overhauling of the pump, the normal opening of the bypass in the outflow connection of the motor does not occur.

A further feature of the invention is provided by the inclusion in the electric portion of the improved electro-hydraulic system of a means providing an electrical signal proportional to the rate of the movement of the rudder. The signal of the included signal means is utilized in the system to control the operation of the self-centralizing actuator for the pump so that the hydraulic steering motor stops at the ordered rudder angle without overshooting or hunting.

Figure 2:
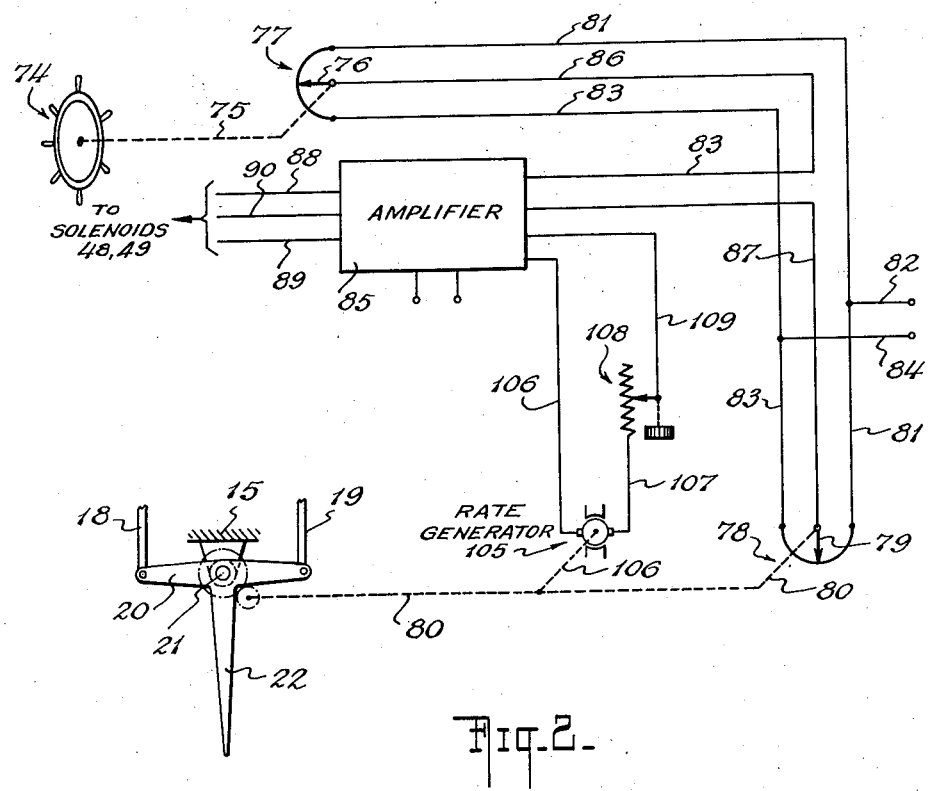
Figure 3:
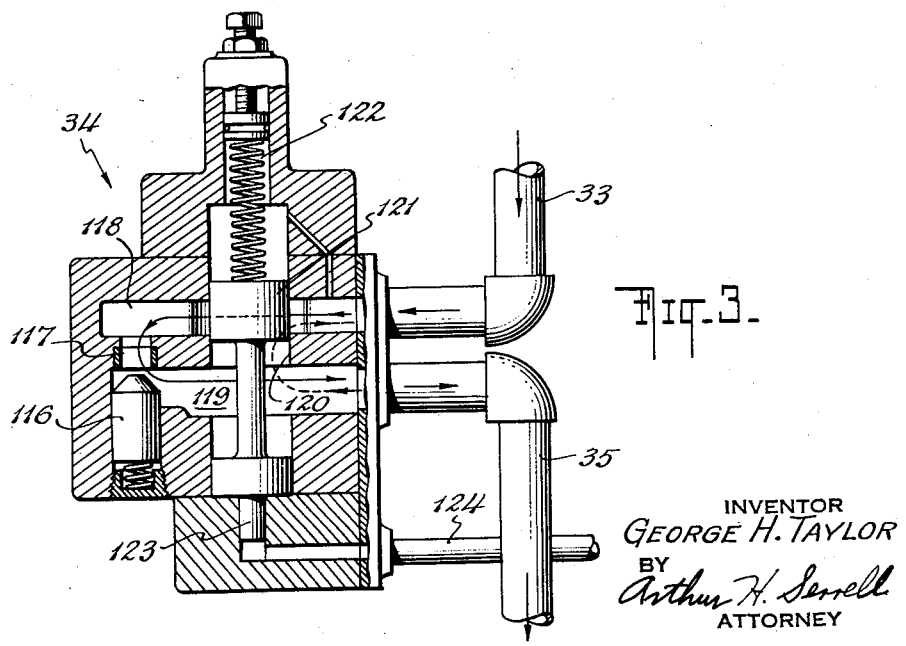

Other objects, features and structural details of the invention will be apparent from the following description when read in relation to the accompanying drawings, wherein Fig. 1 is a schematic representation of an improved electro-hydraulic steering system constructed in accordance with the present invention;

Fig. 2 is a partial view similar to Fig. 1 depicting a modified form of the improved system in which the electrical rate signal is provided by a generator driven directly from the rudder; and Fig. 3 is an enlarged vertical cross section of one of the unidirectional flow control valves shown in the system depicted in Fig. 1 in the hydraulic pipe connecting the hydraulic motor and pump of the system.

As particularly shown in Fig. 1, the hydraulic end of the improved combination, closed loop, servo system includes an hydraulic motor generally indicated at 10. As represented, the motor 10 is provided by a double acting cylinder-piston arrangement of components whose cylinders 11 and 12 are pivotally mounted at one of the respective ends thereof to suitable brackets 13, 14 that are fixed with relation to the craft. A portion of the frame of the craft is indicated at 15. The respective pistons 16, 17 of the arrangement have extending rods 18, 19 that are pivotally connected at the respective ends of a rocker 20. As shown, rocker 20 controls the movement of the rudder shaft 21 that is pivotally mounted at the stern of the craft. The rudder of the craft which is fixed to the shaft 21 is indicated at 22. The fluid line connections to the respective cylinders 11 and 12 are high pressure flexible pipe or hose as indicated at 23 and 24. For double acting operation, hose 23 of the arrangement connects the upper end of cylinder 11 and the lower end of cylinder 12. Likewise hose 24 interconnects the upper end of cylinder 12 and the lower end of cylinder 11. Operation of the motor 10 is dependent upon which hose of the hydraulic circuit receives the output of a reversible, variable delivery, hydraulic pump indicated at 25. With fluid under pressure supplied from pump 25 to hose 23 the rudder 22 moves in a counterclockwise direction as viewed in Fig. 1. When pump 25 supplies fluid under pressure to hose 24, the rudder 22 is urged by the motor 10 in a clockwise direction. The hydraulic motor element of the system shown herein is illustrative as obviously any conventional type of hydraulic ram could be utilized for the purpose.

As shown in Fig. 1, pump 25 is driven by a suitable electric motor 26 that is energized from an electrical source of either direct current or alternating current energy by way of leads 27 and 28. The shaft of the motor 26 drives the pump through a suitable flexible coupling 29. The means for varying the delivery of the conventional pump 25 is shown in Fig. 1 as a stroke control member or rod 30 that is translationally mounted in the housing 31 thereof. The housing 31 provides a fluid reservoir for the fluid received by and delivered from the pump. The pump 25 operates when the control element 32 which is pivotally mounted in the housing 31 is moved from the centralized or non-delivery position thereof shown in the drawing by the stroke member or rod 30. With inward motion of the rod 30 with relation to pump housing 31, the pump is effective to deliver fluid by way of piping or flexible hose 33 to the unidirectional flow valve 34 and from valve 34 by way of hose 35 to the hose 23. This results in corresponding motion of the rudder 22. The amount of displacement of element 32 from the zero stroke position determines the extent of the fluid delivered by the pump. The pump is stroked until the ordered amount of rudder is obtained. For small rudder orders, only a fraction of the pump stroke is utilized. With large rudder orders, the full pump stroke is utilized and the rudder is accelerated at its highest value. The return connections to the pump 25 from the motor 10, with counterclockwise operation of motor 10, include pipe or flexible hose 36 to the unidirectional valve 37 and hose 38 from the valve 37 to the pump 25. With the operation described, the inflow connections of the hydraulic circuit to motor 11 include hoses 33 and 35 and the outflow connections include hoses 36 and 38. With outward motion of the rod 30 with relation to the housing 31, reverse operation of the motor 10 occurs and the rudder is moved correspondingly in a clockwise direction. With this operation, the outflow connections of the hydraulic circuit include hoses 35, 33 and the inflow connections include hoses 38, 36. The operations of the valves 34 and 37 in the system will hereinafter be described in detail.

The displacing means or actuator 39 for the stroke control rod or member 30 of the pump 25 includes a self-centralizing element shown in Fig. 1 as the piston 40 of an hydraulic servomotor 41, the rod 42 of the piston being pivotally connected to the extending end of the reciprocating member 30. The springs 43, 44 within the cylinder 45 of the servomotor engage the piston 40 to hold the pump 25 on zero stroke at all times except when the system is operating to execute command rudder orders. The fluid in the cylinder 45 and cylinder lines when moved by the force of the springs 43, 44 upon completion of a rudder operation, acts to damp the system so that the pump 25 is returned to zero stroke smoothly at a desired time interval. This portion of the system includes a fixed delivery pump 46 for supplying fluid to operate the servomotor 41 by way of a conventional differential valve 47 which controls the direction of flow of the fluid from the pump 46 to the servomotor 41. Electrical means are provided to operate the valve 47 in the form of a pair of oppositely arranged solenoids 48 and 49. As shown, the coils 50 and 51 of the respective solenoids 48, 49 are fixedly mounted on the cylinder 52 of the valve 47. The slide element 53 of the valve 47 having the lands 54, 55, 56 and 57 therein includes extending rods 58, 59 to which the armatures 60 and 61 of the respective solenoids 48, 49 are fixedly attached. Springs 62 and 63 of the arrangement normally hold the slide element 53 in a centralized position within the cylinder 52 of the valve 47. In the position as depicted in the drawing, Fig. 1, the lands 55, 56 block communication between the pump 46 and the ports of the valve communicating with the pipes 64, 65 connecting the valve and the opposite ends of the cylinder 45 of the servomotor 41. The hydraulic end of this portion of the system further includes an outlet pipe 66 from the pump 46 to a flow control valve 67 that is in turn connected to the valve 47 by way of inflow pipes 68 and 69. As shown, pipe 68 is connected to valve 47 at a position between the lands 54 and 55. Also, pipe 69 is connected to valve 47 at a position between the lands 56 and 57. The return line of the hydraulic circuit to the pump 46 includes pipe 70 connected to valve 47 between lands 55, 56, a sump 71 supplied with fluid by way of pipe 70 and pipe 72 which interconnects the sump 71 and pump 46. Operation of the actuator 39 depends on the energization of one of the solenoids 48, 49 of the electrical end of the system.

With movement of the element 53 to the right as viewed in Fig. 1 against the action of spring 59, pipe 68 communicates with pipe 64 through the valve and supplies fluid under pressure to the left hand end of the cylinder 45 of the servomotor 41. The right hand end of the cylinder 45 is further connected to the return line of the hydraulic circuit by way of pipe 65, the valve 47, pipe 70, sump 71 and pipe 72 to the pump 46. This results in movement of the piston 40 of the servomotor 41 to the right as viewed in the drawing causing operation of the stroking means of the variable delivery pump 25 resulting in its operation. Reverse motion of the slide element 53 of valve 47 against the action of spring 58 effects operation of the servomotor 41 in the opposite sense with a corresponding effect on pump 25. Inflow pipe 69 from pump 46 is then connected to the right hand end of the cylinder 45 by way of the valve 47 and pipe 65. The return to the pump 46 is then effected from the left hand end of the cylinder 45, pipe 64, the valve 47, return pipe 70, sump 71 and pipe 72. The fixed delivery pump 46 is driven by motor 26 of the system by way of suitable gearing 73 therebetween.

With reference to Figs. 1 and 2, the most spaced components of the improved combination system are electrical in character and are connected by electrical leads instead of hydraulic hose. As shown, such components include a control member in the form of a movable steering wheel 74 that is connected by shafting 75 to the movable element or slider 76 of an electrical signal means or pick-off such as control potentiometer 77. A second electrical component is provided by a follow back signal means or pick-off shown in the form of a potentiometer 78 whose movable element or slider 79 is operatively connected to the hydraulic motor 10 at the rudder shaft through suitable gearing and shafting 80. The respective potentiometers 77 and 78 are connected differentially in a circuit that includes interconnecting lead 81 and connected lead 82 to a suitable source of alternating current or direct current electrical energy. The circuit further includes interconnecting lead 83 between the elements 77 and 78 and a second energy supplying lead 84 connected thereto. The output of the differential or bridge network is fed to a suitable amplifier 85 by way of lead 86 connected to slider 76 and lead 87 connected to slider 79. The amplifier 85 is chosen in accordance with the type of electrical energy selected to operate the overall system. The output of amplifier 85 controls the operation of the electrical operating means or solenoids 48, 49 for the actuator 39. As shown, one end of the winding 50 or solenoid 48 is connected to amplifier 85 by way of lead 88. The other end of the winding 50 of solenoid 48 is connected to the amplifier by way of lead 89. The third lead 90 from amplifier 85 connects with one of the ends of the coil 51 of solenoid 49. The other end of coil 51 is connected to lead 89 by way of lead 91. The circuit including the stroke actuator operating means 48, 49 therein is responsive to the output of the amplifier 85. The system compares the relative positions of the sliders 76, 79 of the respective potentiometers 77, 78 and provides an input to the amplifier 85 when the same do not correspond. The input signal to the amplifier 85 has a polarity or sense that depends on the relative displacement of the sliders from corresponding positions. The magnitude or amplitude of the signal depends on the degree of the displacement. Operation of the solenoids 48, 49 depends on the signal output of the amplifier 85, one of the same being effective to cause movement of the slide element 53 of valve 47. The servomotor 41 or actuator 39 then operates to control the output of the variable delivery pump 25 to in turn operate the prime mover or hydraulic motor 10 to move the rudder 22. The system is closed by the action of the follow back shafting 80 to the slider 79, the motor 10 operating until the slider 79 again moves to a position corresponding to that of the control slider 76 of potentiometer 77. This zeroes or nulls the input to the amplifier 85 and enables the springs 43, 44 to centralize the stroke control actuator 39.

To prevent overshooting of the rudder 22 in the operation of the system, the same includes a third electrical signal means or pick-off that provides an output in accordance with the speed of operation of the hydraulic motor 10. As shown in Fig. 1, this means is provided by a rate potentiometer 92 whose slider or movable part 93 is positioned in accordance with the position of the pump stroke member 30 as actuated by the piston 40 of servomotor 41. This drive is effected by shafting 94 to the slider 93 and a rack and pinion connection to an extending portion of rod 95 from piston 40. In the zero stroke position of actuator 39, the slider 93 of pick-off or potentiometer is centered and the same accordingly provides no output. As shown, potentiometer 92 is located in a bridge circuit relation with a center tapped resistor 96 whose respective ends are connected to the potentiometer 92 by leads 97, 98. Energy supplying leads 99, 100 to the respective leads 97, 98 feed the same type of electrical energy thereto as provided at leads 82, 84 of the system. The potentiometer 92 accordingly provides an output when the slider 93 is moved from its central or null position. This output is fed as a further input to amplifier 85 to control the operation of solenoids 48 and 49 so that the system functions without overshooting. As shown, lead 101 connects the slider 93 to the amplifier 85. The second input lead to the amplifier 85 is obtained from lead 102 at the center tapped position of resistor 96, potentiometer 103 and lead 104. The magnitude of the voltage signal obtained from potentiometer 92 is adjusted by the potentiometer 103 so that the rudder of the system moves to a stop at exactly the desired position without overshooting. In the embodiment of the invention shown in Fig. 2, a signal corresponding to that obtained from the rate potentiometer 92 is provided by a rate generating signal means in the form of a rate generator 105 that is a conventional form of permanent magnet generator whose armature or movable part is driven by the hydraulic steering motor 10 by way of shafting 80 and connected shafting 106. The output of generator 105 is in accordance with speed at which the motor 10 is operating. As shown, the generator 105 feeds the amplifier 85 by way of lead 106 and lead 107, potentiometer 108 and lead 109. Potentiometer 108 adjusts the magnitude of the signal fed to the amplifier 85 so as to eliminate over-shooting in the same manner as that provided by potentiometer 103. The network controlling the solenoids 48, 49 includes either of the signal means depicted in Figs. 1 and 2 respectively as potentiometer 92 and rate generator 105.

The fixed delivery pump 46 of the system replenishes fluid in the hydraulic power loop including pump 25 and motor 10. In this regard, the outflow pipe 66 of pump 46 is connected to the hoses 33, 38 of the power loop by way of pipe 110, the respective inflow regulating pressure valves 111, 112 and connecting hose 113, 114. A pressure relief valve 115 for the fluid in pipe 110 prevents the pressure in the replenishing piping of the system from exceeding a predetermined limit. The valve 115 operates to relieve fluid from this end of the system and return it to the sump 71.

The overhauling control included in the system is provided by the valves 34 and 37 which allow fluid to flow outward from the pump 25 to the cylinders 11 and 12 at all times but prevent any return flow until a predetermined pressure is established in the opposite cylinder line by normal rudder demand. In this manner, the valves 34, 37 act as a brake against any overhauling torque so that the rudder rate cannot exceed that which the flow from the pump 25 commands. At all times when rudder is not ordered, the rudder is hydraulically locked by the valves 34, 37, the hydraulic circuit being arranged so that this lock can only be released when a normal rudder order is given the control system at control member 74.

The hydraulic motor 10 of the system is differentially operated directly by the fluid delivered thereto from the pump 25 by way of reversible inflow and outflow connections wherein the valves 34, 37 operate to control the flow of fluid unidirectionally from the pump to the motor cylinders. The internal structure of the valves 34 and 37 is shown in Fig. 3 wherein spring positioned piston 116 normally engages its seat 117 so that communication between hose 33, 35 and 38, 36 is blocked. In this regard channel 118 in the valve 34 directly connects with the hose 33 and channel 119 directly connects with the hose 35. When the lines with hoses 33, 35 provide an inflow connection to cylinder 11, the fluid delivered from pump 25 to the hose 33 under pressure moves the piston 116 off its seat 117 and permits the unidirectional flow of fluid to the noted cylinder 11 by way of hose 35. With loss in pressure in hose 33, the piston 116 returns to its seat 117 and blocks any return flow of fluid from the cylinder 11. In the unidirectional control of the flow of fluid to cylinder 12 of the system, the valve 37 operates in the manner described for valve 34. As shown, the hydraulic power loop includes normally ineffective means for bypassing the unidirectional control valves provided by piston 116 and seat 117 in the illustrated valve 34. Such means is included in the structure of the valves 34, 37 and as shown in Fig. 3 for valve 34 is provided by a channel 120 in the housing of the valve 34 that connects channels 118 and 119. Channel 120 is cylindrical in shape and receives a piston closure part 121 that is biased to a closed position by spring 122. The part 121 of the bypassing means is a portion of a slide element which includes piston 123. A hose 124 connects hose 36 to valve 34 to move the piston 123 when the pump 25 is delivering fluid under pressure to the cylinder 12. Under this condition closure part 121 moves upwardly against the action of spring 122 and outflow connection from cylinder 11 is opened to the pump through the bypass channel 120 between the hoses 35 and 33. Piston 123 and hose 124 of the arrangement constitute a means responsive to the fluid pressure in the inflow connection to the motor 10 for rendering the fluid bypass means in the outflow connection of the loop effective. To reverse operation of the motor 10, a hose 125 for the valve 37 receives the fluid pressure in the inflow connection hose 35 to cylinder 11 so that the bypass in valve 37 is opened to permit operation of the system.

The system is locked by the brake valves 34 and 37 so that movement of the rudder such as caused by the same striking an object is prevented. To prevent excessive pressure built up in the cylinders 11 and 12 of the system under such conditions, pressure relief valves 126 and 127 between hoses 35 and 36 are included in the system.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a closed loop servo system for steering dirigible craft, the combination of, a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a follow-back electrical signal means having a movable element operatively connected to said steering motor, means for displacing said pump stroke control member including a self-centralizing movable element operatively connected to said stroke member, electrical operating means for said displacing means, and a circuit including said electrical operating means having said control member signal means and said followback signal means arranged in differential relation therein.

2. A combination of the character claimed in claim 1, in which the circuit having said electrical operating means therein further includes a third electrical signal means providing an output in accordance with the speed of the hydraulic motor.

3. A servo system for steering dirigible craft including a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a followback electrical signal means having a movable element operatively connected to said steering motor, a self-centralizing actuator for said pump stroke member, a third electrical signal means having a movable part positioned in accordance with the position of said pump stroke member, electrical operating means for said actuator, and a circuit including said electrical operating means for said actuator having said control member signal means and said followback signal means arranged in differential relation and including said third electrical signal means therein.

4. A servo system for steering dirigible craft including a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a followback electrical signal means having a movable element operatively connected to said steering motor, means for displacing said pump stroke member including a self-centralizing movable element operatively connected to said stroke member, a rate generating electrical signal means having a movable part driven by the hydraulic steering motor, electrical operating means for said displacing means, and a circuit including said electrical operating means having said control member signal means and said followback signal means arranged in differential relation, and including said rate signal means therein.

5. The combination in a closed loop servo system for steering dirigible craft, of, a steering control electrical pick-off, a reversible, variable delivery, hydraulic pump having a stroke control member, a hydraulic motor for steering the craft operated directly by the fluid delivered thereto from said pump, a followback electrical pick-off driven by said motor, electrical means for controlling the operation of said pump including a self-centralizing element operatively connected to said stroke control member, and a circuit including said electrical controlling means having said control and followback pick-off arranged in differential relation therein operable to energize said electrical controlling means.

6. A combination of the character claimed in claim 5, including electrical means providing an output in accordance with the speed of operation of said motor, and means for feeding the output of said electrical output means to said circuit means to energize said electrical pump controlling means.

7. In a closed loop servo system for steering dirigible craft, the combination of, a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a followback electrical signal means having a movable element operatively connected to said steering motor, a hydraulic servomotor having a self-centralizing piston element for operating said pump stroke control member, a fixed delivery pump for supplying fluid to operate said servomotor, differential valve means for controlling the direction of flow of the fluid from the fixed delivery pump to the servomotor, electrical means for operating said differential valve means, and a circuit including said valve operating electrical means having said control member signal means and said followback signal means arranged in differential relation therein.

8. A combination of the character claimed in claim 7, in which the circuit having said valve operating electrical means therein further includes a third electrical signal means providing an output in accordance with the speed of operation of said motor.

9. A servo system for steering dirigible craft including a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a followback electrical signal means having a movable element operatively connected to said steering motor, a hydraulic servomotor having a self-centralizing piston element for operating said pump stroke control member, a fixed delivery pump for supplying fluid to operate said servomotor, differential valve means for controlling the direction of flow of the fluid from the fixed delivery pump to the servomotor, a third electrical signal means having a movable part positioned in accordance with the position of said control member, electrical means for operating said differential valve means, and a circuit including said valve operating means and said third signal means having said control member signal means and said followback signal means arranged in differential relation therein.

10. A servo system for steering dirigible craft including a steering control member having a movable part, electrical signal means having a movable element operatively connected to the control member movable part, a reversible, variable delivery, hydraulic pump having a stroke control member, a hydraulic motor for steering the craft operated directly by the fluid delivered thereto from said pump, a followback electrical signal means having a movable element operatively connected to said steering motor, a hydraulic servomotor having a self-centralizing piston element for operating said pump stroke control member, a fixed delivery pump for supplying fluid to operate said servomotor, differential valve means for controlling the direction of flow of the fluid from the fixed delivery pump to the servomotor, a rate generating electrical signal means having a movable part driven by the hydraulic steering motor, electrical means for operating said differential valve means, and a circuit including said valve operating means and said rate signal means having said control signal means and said followback signal means arranged in differential relation therein.

11. The combination in a servo system for steering dirigible craft, of, a steering control electric pick-off, a reversible, variable delivery, hydraulic pump having means for varying the delivery of the pump, a hydraulic motor for steering the craft operated directly by the fluid delivered thereto from said pump, a followback electric pick-off, a hydraulic servomotor having a self-centralizing piston element for operating the pump delivery varying means, a fixed delivery pump for supplying fluid to operate said servomotor, differential valve means for controlling the direction of flow of the fluid from the fixed delivery pump to the servomotor, electrical means for operating said valve means, and circuit means differentially including said control and followback pick-offs operable to energize said electrical operating means.

12. The combination in a servo system, of, an hydraulic loop including a reversible, variable delivery, hydraulic pump with means for varying the delivery of the pump, a hydraulic power motor differentially operated directly by the fluid delivered thereto from the pump by way of reversible inflow and outflow connections, valve means in said respective connections for controlling the flow of fluid unidirectionally from the pump into the motor, normally ineffective means for bypassing said unidirectional flow valve means in each of said connections, means for operating said delivery varying means of the pump, and means responsive to the fluid pressure in the inflow connection to the motor for rendering the fluid bypass means in the outflow connection of the loop effective.

13. The combination claimed in claim 12, in which said delivery varying operating means includes an electrical network having a control signal pick-off, a followback signal pick-off operated by the power motor, electrical means providing a signal in accordance with the speed of operation of the motor, and an electrical device responsive to the signals of said pick-offs and said signal means having a self-centralizing movable element.

14. The combination claimed in claim 12, in which said delivery varying operating means includes a hydraulic servomotor having a self-centralizing piston element, a fixed delivery pump for supplying fluid to operate the servomotor, differential valve means for controlling the direction of flow of the fluid from the fixed delivery pump to the servomotor, and an electrical device for operating said valve means in accordance with the signals of a controlling pick-off, a followback pick-off connected to the power motor, and an electric generator providing a signal in accordance with the speed of operation of the hydraulic motor.

References Cited in the file of this patent
UNITED STATES PATENTS

| | | |
|---|---|---|
| 2,111,594 | Kuzelewski | Mar. 22, 1938 |
| 2,213,968 | Rose | Sept. 10, 1940 |
| 2,384,962 | Pohl | Sept. 18, 1945 |